United States Patent
Oshima et al.

(10) Patent No.: US 10,922,815 B2
(45) Date of Patent: Feb. 16, 2021

(54) IMAGE PROCESSING APPARATUS, IMAGE PROCESSING PROGRAM, AND IMAGE PROCESSING METHOD

(71) Applicant: Sony Corporation, Tokyo (JP)

(72) Inventors: Shiori Oshima, Kanagawa (JP); Kazuhiro Nakagawa, Saitama (JP); Eriko Matsui, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/433,998

(22) Filed: Jun. 6, 2019

(65) Prior Publication Data

US 2019/0362493 A1    Nov. 28, 2019

Related U.S. Application Data

(63) Continuation of application No. 15/502,252, filed as application No. PCT/JP2015/003913 on Aug. 4, 2015, now Pat. No. 10,360,679.

(30) Foreign Application Priority Data

Aug. 15, 2014 (JP) ................................. 2014-165564

(51) Int. Cl.
  *G06T 7/00* (2017.01)
  *G06T 7/223* (2017.01)
  *G06T 7/20* (2017.01)

(52) U.S. Cl.
  CPC .............. *G06T 7/0012* (2013.01); *G06T 7/20* (2013.01); *G06T 7/223* (2017.01);
  (Continued)

(58) Field of Classification Search
  None
  See application file for complete search history.

(56) References Cited

U.S. PATENT DOCUMENTS 7,828,711 B2   11/2010   Ross et al.
10,360,679 B2   7/2019   Oshima et al.
(Continued)

FOREIGN PATENT DOCUMENTS

JP   2005-095172 A   4/2005
JP   2007-233238 A   9/2007
(Continued)

OTHER PUBLICATIONS

International Search Report and Written Opinion thereof dated Oct. 30, 2015 in connection with International Application No. PCT/JP2015/003913.
(Continued)

*Primary Examiner* — Vikkram Bali
(74) *Attorney, Agent, or Firm* — Wolf, Greenfield & Sacks, P.C.

(57) ABSTRACT

According to some aspects, an information processing apparatus is provided. The information processing apparatus includes at least one processor configured to receive an image of a plurality of images. The information processing apparatus further includes at least one storage medium configured to store processor-executable instructions that, when executed by the at least one processor, perform a method. The method includes setting at least one axial direction in the image, wherein the image includes an analysis target. The method further includes determining motion information for the analysis target by analyzing motion of the analysis target to identify, with respect to the at least one axial direction, at least one of a motion amount of the analysis target and a motion direction of the analysis target.

22 Claims, 17 Drawing Sheets

(52) U.S. Cl.
CPC .............. *G06T 2207/10016* (2013.01); *G06T 2207/10056* (2013.01); *G06T 2207/20021* (2013.01); *G06T 2207/20104* (2013.01); *G06T 2207/30048* (2013.01)

(56) References Cited

U.S. PATENT DOCUMENTS

2012/0128637 A1    5/2012   Lancaster et al.
2017/0236277 A1    8/2017   Oshima et al.

FOREIGN PATENT DOCUMENTS

JP         2009-063509 A      3/2009
WO     WO 2014/102449 A1    7/2014

OTHER PUBLICATIONS

International Preliminary Report on Patentability dated Mar. 2, 2017 in connection with International Application No. PCT/JP2015/003913.

$$\begin{bmatrix} x' \\ y' \end{bmatrix} = \begin{bmatrix} \cos\theta & -\sin\theta \\ \sin\theta & \cos\theta \end{bmatrix} \begin{bmatrix} x \\ y \end{bmatrix}$$

IMAGE PROCESSING APPARATUS, IMAGE PROCESSING PROGRAM, AND IMAGE PROCESSING METHOD

CROSS REFERENCE TO RELATED APPLICATIONS

This application is a continuation of and claims the benefit under 35 U.S.C. § 120 of U.S. patent application Ser. No. 15/502,252, titled "IMAGE PROCESSING APPARATUS, IMAGE PROCESSING PROGRAM, AND IMAGE PROCESSING METHOD," filed on Feb. 7, 2017, which is a national stage filing under 35 U.S.C. 371 of International Patent Application Serial No. PCT/JP2015/003913, entitled "IMAGE PROCESSING APPARATUS, IMAGE PROCESSING PROGRAM, AND IMAGE PROCESSING METHOD", filed Aug. 4, 2015, which claims priority under 35 U.S.C. § 119(a) to Japanese Patent Application JP 2014-165564, filed Aug. 15, 2014. The entire contents of these applications are hereby incorporated by reference in their entireties.

TECHNICAL FIELD

The present disclosure relates to an image processing apparatus, an image processing program, and an image processing method that performs an image analysis on a moving image obtained by imaging an analysis target with time.

BACKGROUND ART

In preparation for drug discovery and regenerative medicine, there have been problems of functional evaluation of cells, and various analytical techniques have been studied therefor. One of the analytical techniques is an image analysis to acquire information of a cell by analyzing a moving image, which is obtained by imaging a cell to be analyzed with time.

For example, Patent Literature 1 discloses a method of analyzing neurite outgrowth by fluorescent dyeing and image processing. Further, Patent Literature 2 discloses a method of evaluating a neural network of neuron by an image analysis.

CITATION LIST

Patent Literature

PTL 1: Japanese Patent Application Laid-open No. 2005-095172
PTL 2: Japanese Patent Application Laid-open No. 2007-233238

SUMMARY

Technical Problem

There are some cells having motions that are detectable in an image. For example, cardiac myocytes contract and relax, and neurons perform axonal transport, outgrowth, and the like. If such motions can be detected by an image analysis, it is effective for functional evaluation of cells.

However, for the functional evaluation of cells, a mere extraction of a motion is not sufficient. This is because a motion of a cell includes a motion of a cell itself (expansion and contraction etc.), a motion due to a surrounding fluid flow, and the like. Additionally, in the motion of a cell, its direction is important in some cases. For example, in the case of cardiac myocytes, a motion along an expansion and contraction direction of cardiac muscle is important, and for the functional evaluation, it is necessary to extract a motion along that direction. Further, in the case of a neuron, there are various motions including an oscillation of a cell body, axonal transport, outgrowth, and the like. In such motions, directions and properties of the respective motions are different from one another.

In view of the circumstances as described above, it is desirable to provide an image processing apparatus, an image processing program, and an image processing method that are capable of evaluating a motion of an analysis target.

Solution to Problem

According to an aspect of the present application, an information processing apparatus including at least one processor and at least one storage medium is provided. The at least one processor is configured to receive an image of a plurality of images. The at least one storage medium is configured to store processor-executable instructions that, when executed by the at least one processor, perform a method. The method includes setting at least one axial direction in the image, wherein the image includes an analysis target, and determining motion information for the analysis target by analyzing motion of the analysis target to identify, with respect to the at least one axial direction, at least one of a motion amount of the analysis target and a motion direction of the analysis target.

According to an aspect of the present application, at least one non-transitory computer-readable storage medium storing computer-executable instructions that, when executed, perform a method for processing an image is provided. The method includes setting at least one axial direction in the image. The image includes an analysis target. The method further includes determining motion information for the analysis target by analyzing motion of the analysis target to identify, with respect to the at least one axial direction, at least one of a motion amount of the analysis target and a motion direction of the analysis target.

According to an aspect of the present application, an information processing system is provided. The information processing system includes an imaging apparatus configured to acquire a plurality of images, at least one processor configured to receive an image of the plurality of images, and at least one storage medium configured to store processor-executable instructions that, when executed by the at least one processor, perform a method. The method includes setting at least one axial direction in the image. The image includes an analysis target. The method further includes determining motion information for the analysis target by analyzing motion of the analysis target to identify, with respect to the at least one axial direction, at least one of a motion amount of the analysis target and a motion direction of the analysis target.

According to an aspect of the present application, a method for processing an image is provided. The method includes setting at least one axial direction in the image. The image includes an analysis target. The method further includes determining motion information for the analysis target by analyzing motion of the analysis target to identify, with respect to the at least one axial direction, at least one of a motion amount of the analysis target and a motion direction of the analysis target.

Advantageous Effects of Invention

As described above, according to the present disclosure, it is possible to provide an image processing apparatus, an image processing program, and an image processing method that are capable of evaluating a motion of an analysis target.

DESCRIPTION OF EMBODIMENTS

Description will be given on an image processing apparatus according to an embodiment of the present disclosure.

(Functional Configuration of Image Processing Apparatus)

Figure 1:
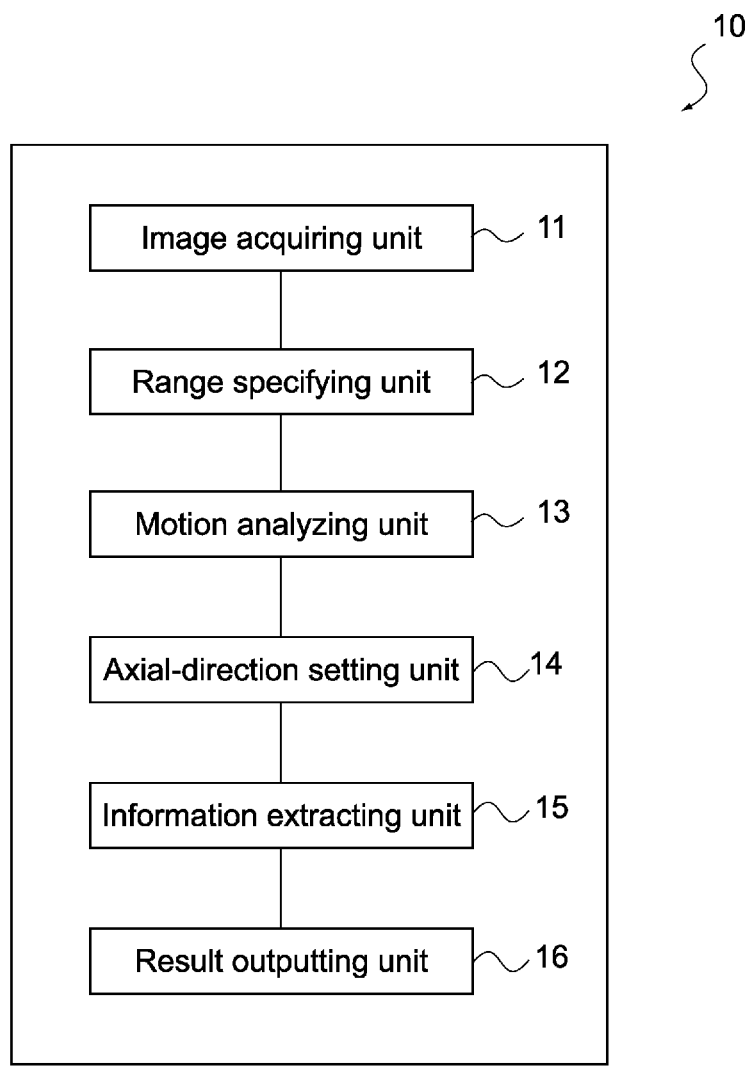
FIG. 1 is a schematic diagram showing a functional configuration of an image processing apparatus according to an embodiment of the present disclosure.

FIG. 1 is a schematic diagram showing a functional configuration of an image processing apparatus 10 according to this embodiment. As shown in FIG. 1, the image processing apparatus 10 includes a moving image acquiring unit 11, a range specifying unit 12, a motion analyzing unit 13, an axial-direction setting unit 14, an information extracting unit 15, and a result outputting unit 16.

The moving image acquiring unit 11 acquires an "analysis-target moving image". The analysis-target moving image is a moving image obtained by imaging an analysis target with time. The analysis-target moving image includes moving images formed of a plurality of successively imaged frames, and still images obtained by time-lapse imaging. The analysis target is a cell, a cell group, a biological tissue, or the like. If the analysis target can move, this embodiment can be applied to such an analysis target. An imaging speed of the analysis-target moving image can be appropriately set in accordance with the analysis target.

The analysis-target moving image is assumed to be imaged by various types of optical imaging methods including bright-field imaging, dark-field imaging, phase-difference imaging, fluorescence imaging, confocal imaging, multiphoton-excited fluorescence imaging, absorption spectrum imaging, and scattered-light imaging.

Figure 2:
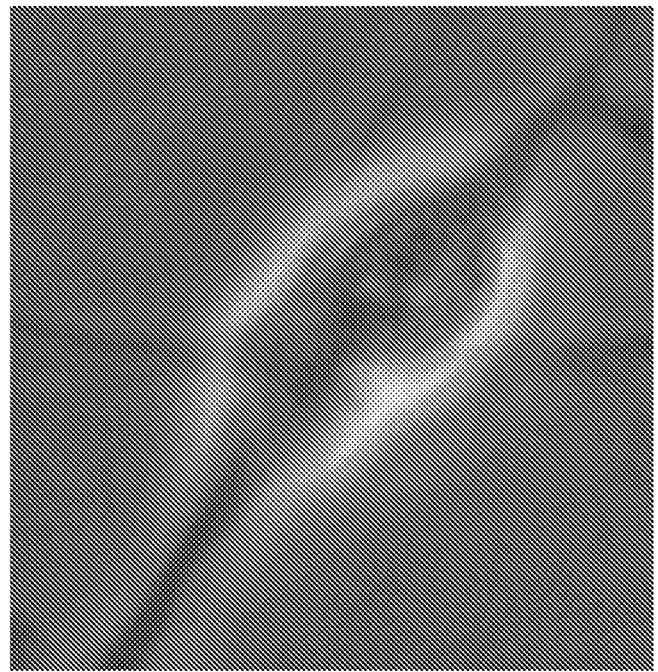
FIG. 2 is an exemplary analysis-target moving image that is acquired by a moving image acquiring unit of the image processing apparatus.
Figure 3:
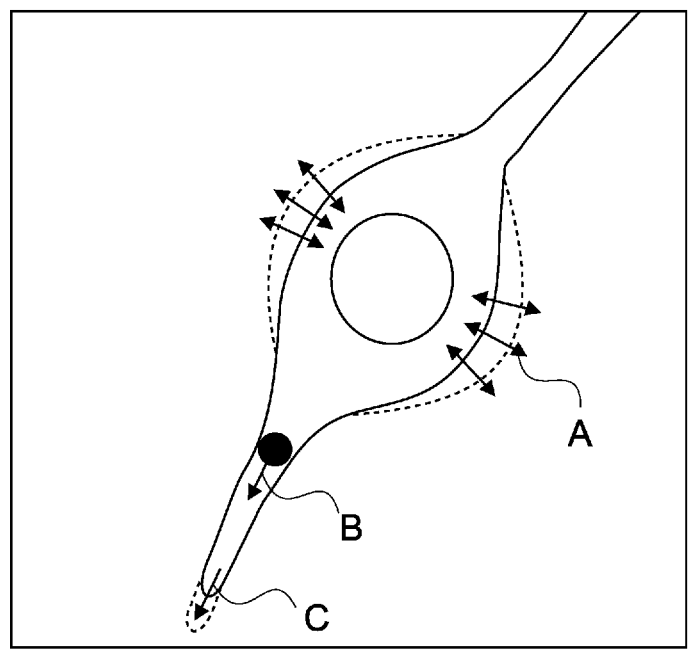
FIG. 3 is a schematic diagram showing an example of a motion in the analysis-target moving image.

FIG. 2 is an exemplary analysis-target moving image and is a moving image including a neuron. FIG. 3 is a schematic diagram showing an example of a motion of a neuron. The neuron has various motions including oscillations of a cell body as indicated by A of FIG. 3, axonal transport (transport for intracellular minute organ in axon) as indicated by B, axonal outgrowth indicated by C, and the like. In addition, similar to the neuron, there are cells having various motions. The cells are moving by themselves or moving by extracellular environments (surrounding water flow and the like) in some cases. In this embodiment, those motions can be discriminated.

The moving image acquiring unit 11 may acquire an analysis-target moving image from an imaging apparatus (microscope imaging apparatus) (not shown). Alternatively, the moving image acquiring unit 11 may also acquire, as an analysis-target moving image, a moving image stored in storage or a moving image supplied from a network. At that time, the moving image acquiring unit 11 may perform sampling on previously-captured moving images at predetermined cycles in accordance with the type of the analysis target, to acquire an analysis-target moving image.

Figure 4:
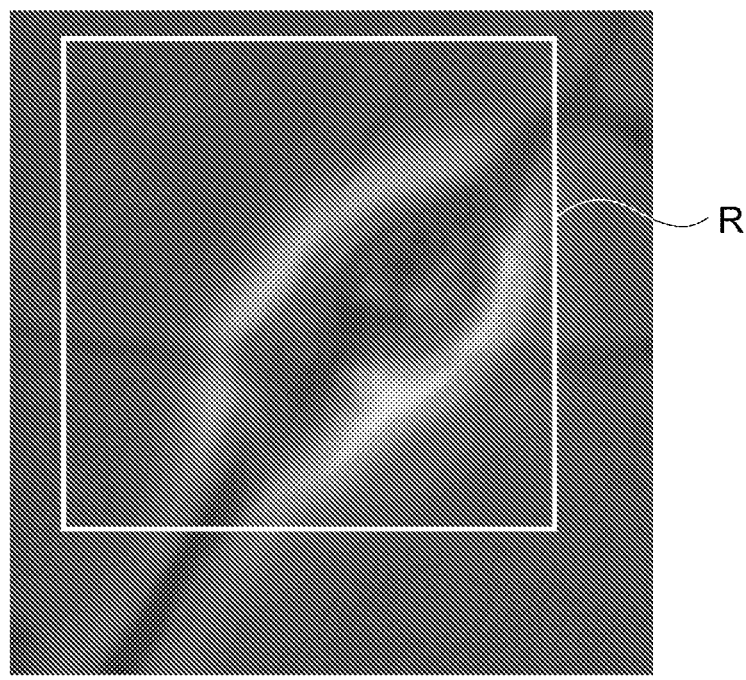
FIG. 4 is a schematic diagram of an analytical range that is specified by a range specifying unit of the image processing apparatus.

The range specifying unit 12 specifies an analytical range in the analysis-target moving image. FIG. 4 is a schematic diagram showing an example of the analytical range. As shown in FIG. 4, the range specifying unit 12 specifies an analytical range R in the analysis-target moving image. The analytical range R may be a range including, for example, one cell or a cell group. Further, the analytical range R may be the entire range of the analysis-target moving image.

The range specifying unit 12 may specify a range, which is instructed by an operation input by a user, as the analytical range R. Alternatively, the range specifying unit 12 may detect the analysis target by image processing performed on the analysis-target moving image and specify a range of the analysis target as the analytical range R.

Figure 5:
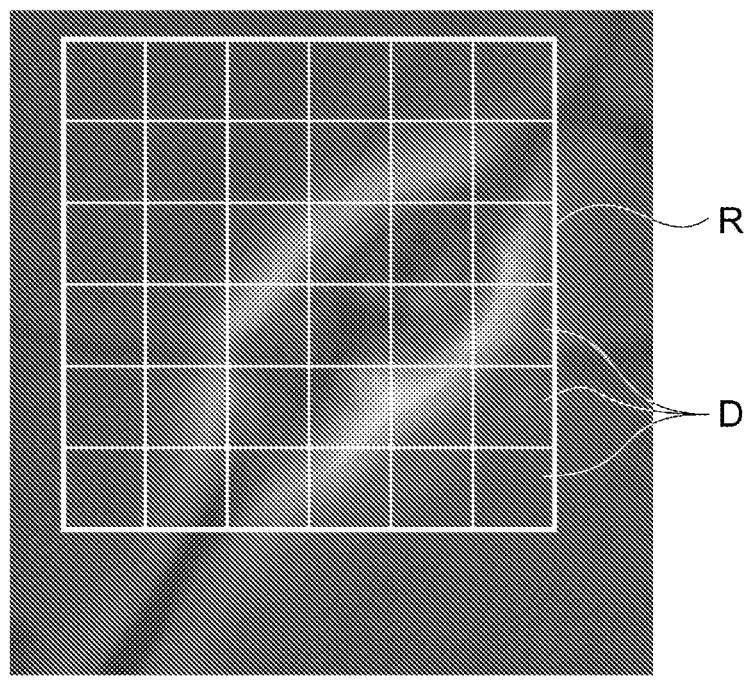
FIG. 5 is a schematic diagram of an analytical range that is set by a motion analyzing unit of the image processing apparatus.

The motion analyzing unit 13 calculates a motion vector from the analytical range R. The motion analyzing unit 13 sets a plurality of calculation sections within the analytical range R. FIG. 5 is a schematic diagram showing an example of the calculation sections. As shown in FIG. 5, the motion analyzing unit 13 sections the analytical range R into a plurality of calculation sections D.

The number of calculation sections D and the sizes thereof may be arbitrarily set. The motion analyzing unit 13 can set the calculation sections D according to a specification by the user or the size of the analytical range R. It should be noted that the motion analyzing unit 13 may set the entire analytical range R as one calculation section D.

Figure 6:
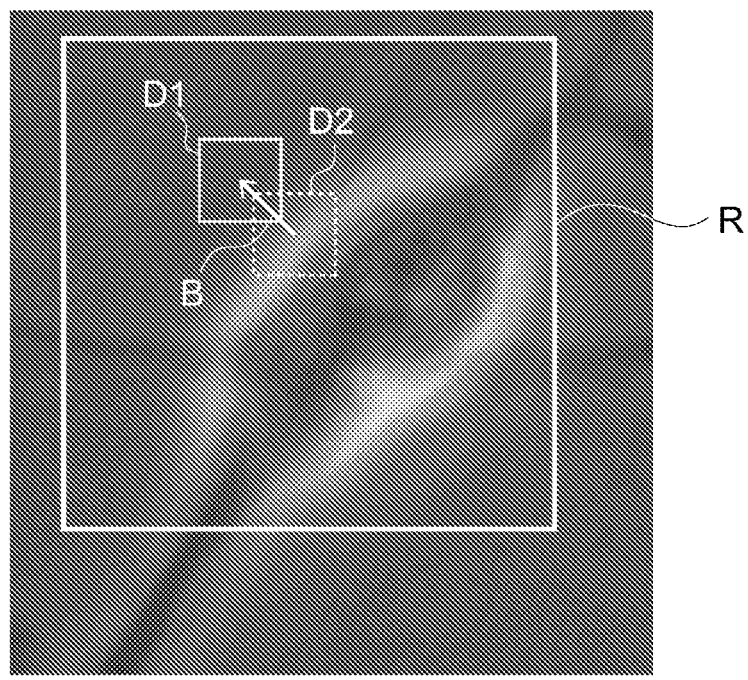
FIG. 6 is a schematic diagram showing calculation of a motion vector by the motion analyzing unit of the image processing apparatus.

Subsequently, the motion analyzing unit 13 calculates a motion vector of each of the calculation sections D. The motion analyzing unit 13 can calculate a motion vector of each of the calculation sections D by block matching. FIG. 6 is a schematic diagram showing a state of calculation of the motion vector.

As shown in FIG. 6, the motion analyzing unit 13 compares a pixel group, which is included in a specific calculation section D (in FIG. 6, calculation section D1) in one frame that forms the analysis-target moving image, with a pixel group of a range in a previous frame, to specify the best matched range of the pixel groups (in FIG. 6, pixel range D2). It should be noted that the previous frame may be located one frame before the current frame or some frames before the current frame. Pixel groups between different image frames may be identified as best matched when there is a large degree of matching and/or similarity between the pixel groups. For example, a comparison between a pixel group in a first image to pixel groups in a second image, where the second image is acquired prior to the first image, may allow for determining a pixel group in the second image having a largest degree of matching with the first pixel group.

The motion analyzing unit 13 can calculate a vector that extends from the pixel range D2 specified in the previous frame to the calculation section D1 of the current frame, as a motion vector of the calculation section D1 (hereinafter, referred to as calculation section vector B). Similarly, the motion analyzing unit 13 calculates a calculation section vector for each of the calculation sections D included in the analytical range R.

Figure 7:
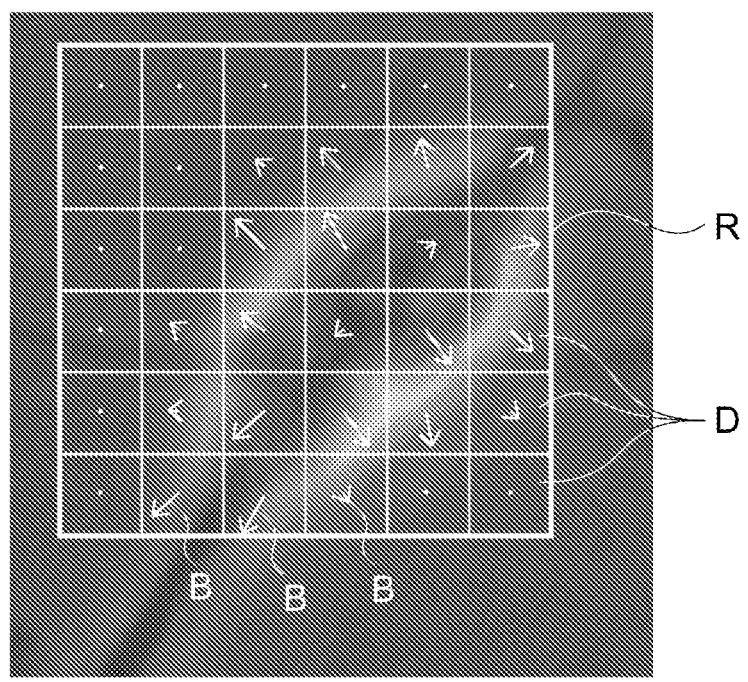
FIG. 7 is a schematic diagram of motion vectors that are calculated by the motion analyzing unit of the image processing apparatus.

FIG. 7 is a schematic diagram showing an example of the calculation section vectors B calculated in the respective calculation sections D. In FIG. 7, the direction of an arrow represents the direction of the calculation section vector B, and the length of the arrow represents the magnitude of the calculation section vector B (a dot represents a motion vector 0). The calculation section vectors B are calculated for each of the frames of the analysis-target moving image and thus vary with time of the analysis-target moving image. It should be noted that the motion analyzing unit 13 may calculate the calculation section vectors B by a technique other than the block matching.

Figure 8:
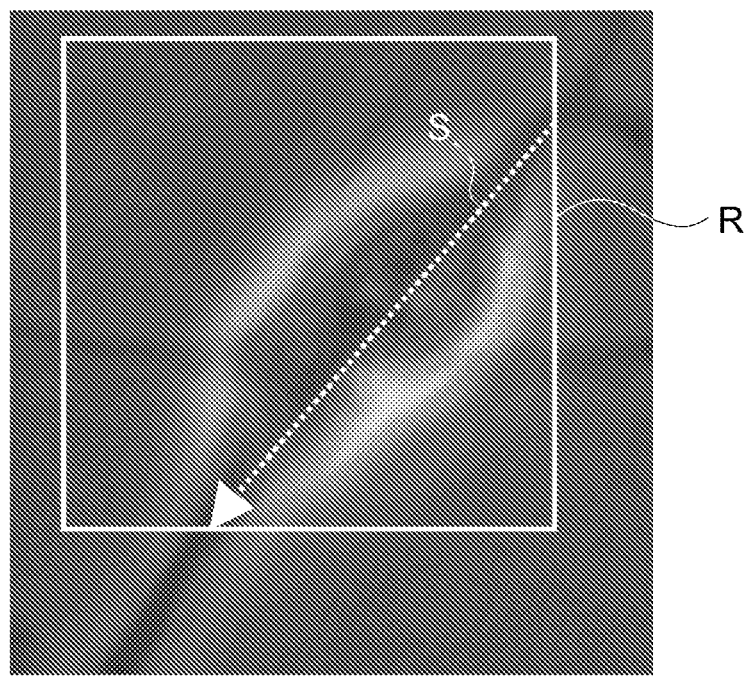
FIG. 8 is a schematic diagram of an axial direction that is set by an axial-direction setting unit of the image processing apparatus.
Figure 9:
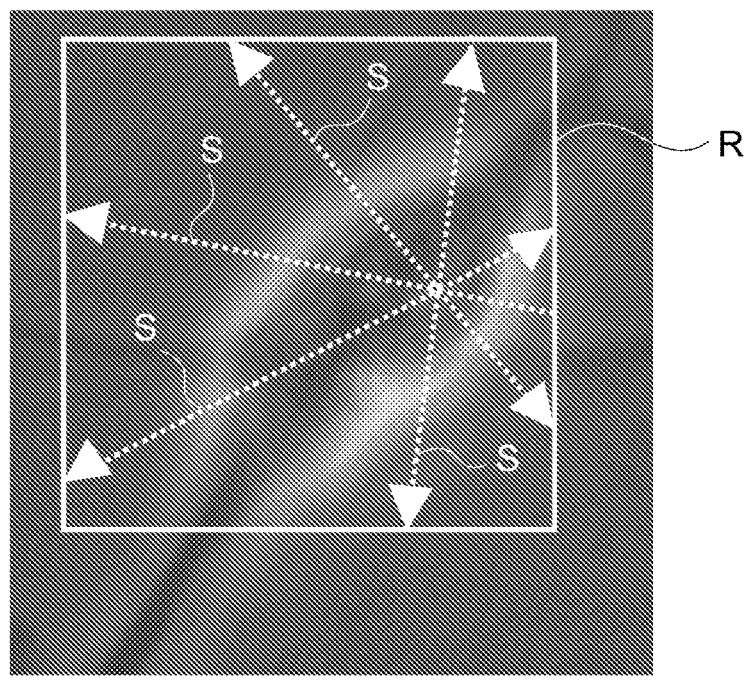
FIG. 9 is a schematic diagram of axial directions that are set by the axial-direction setting unit of the image processing apparatus.

The axial-direction setting unit 14 sets an axial direction for the analytical range R. FIGS. 8 and 9 are schematic diagrams each showing an axial direction S that is set for the analytical range R. The axial-direction setting unit 14 can set a direction specified by the user as an axial direction. The user can set a direction, in which a motion is intended to be extracted in the analysis-target moving image, as an axial direction.

For example, in FIG. 8, the axial direction S is set along the axon of the neuron. Further, the axial-direction setting unit 14 may set a plurality of axial directions. FIG. 9 shows the axial directions S that are radially set from the center of the cell body.

Additionally, the axial-direction setting unit 14 may set an axial direction by image processing for the analysis-target moving image. For example, the axial-direction setting unit 14 may detect an analysis target included in the analysis-target moving image, and set a long-side direction thereof as an axial direction or set an axial direction radially from the center of the analysis target. Alternatively, the axial-direction setting unit 14 may set a direction of a motion vector of an analytical range calculated for the analytical range, which will be described later, as an axial direction.

The information extracting unit 15 extracts information on the motion of the analysis target with respect to the axial direction in the analysis-target moving image (hereinafter, motion information), based on the calculation section vector and the axial direction. The information extracting unit 15 can calculate a motion vector for the analytical range R (hereinafter, analytical range vector) from the calculation section vectors B of the respective calculation sections D supplied from the motion analyzing unit 13.

Figure 10:
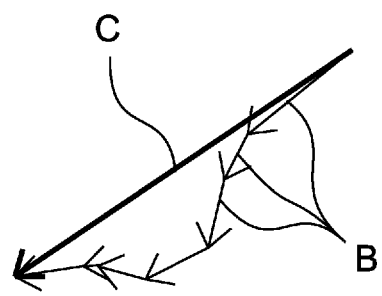
FIG. 10 is a schematic diagram showing calculation of a motion vector for the analytical range, by an information extracting unit of the image processing apparatus.

FIG. 10 is a schematic diagram showing a state in which the analytical range vector is calculated. As shown in FIG. 10, the information extracting unit 15 can add the calculation section vectors B of the respective calculation sections D included in the analytical range R, to calculate an analytical range vector C.

Figure 11:
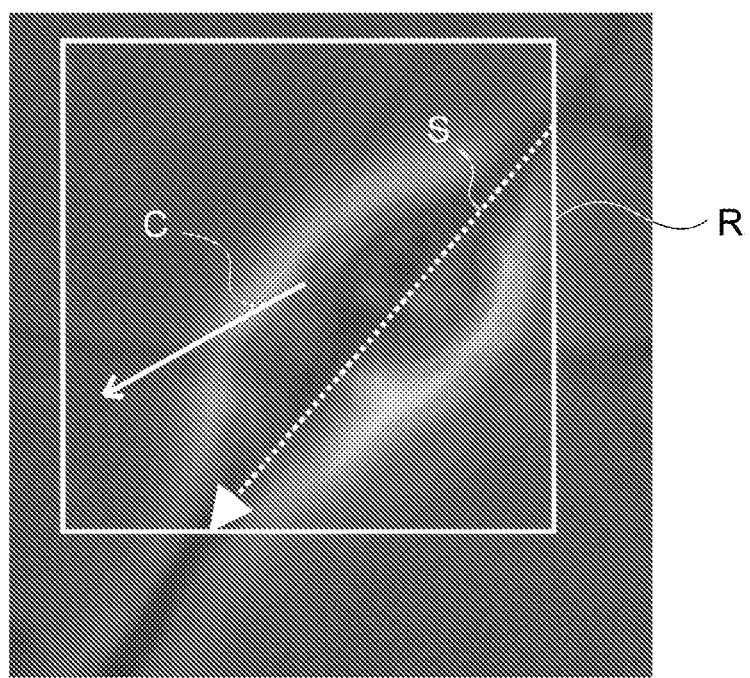
FIG. 11 is a schematic diagram showing a motion vector for the analytical range, which is calculated by the information extracting unit of the image processing apparatus, and the axial direction.

Additionally, the information extracting unit 15 may set a calculation section vector B having the largest motion amount (length) as an analytical range vector. FIG. 11 is a schematic diagram showing the analytical range vector C calculated for the analytical range R, and the axial direction S. As described above, since each calculation section vector B varies with time of the analysis-target moving image, the analytical range vector C also varies with time.

Figures 12, 13:
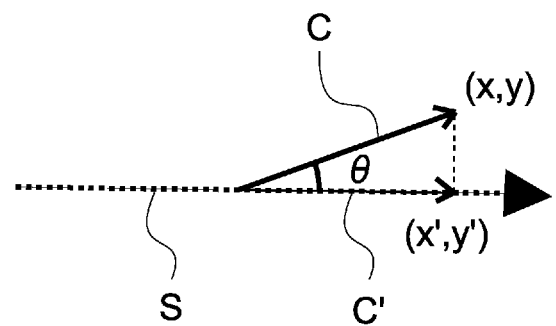
FIG. 12 is a schematic diagram showing a relationship between the motion vector calculated for the analytical range and the axial direction.
FIG. 13 is a conversion equation for projecting the motion vector by the information extracting unit of the image processing apparatus.

The information extracting unit 15 extracts motion information based on the analytical range vector C and the axial direction S. FIG. 12 is a schematic diagram showing a relationship between the analytical range vector C and the axial direction S. The information extracting unit 15 can project the analytical range vector C onto the axial direction S.

FIG. 12 shows a projected analytical range vector (hereinafter, projected vector) C'. As shown in FIG. 12, the information extracting unit 15 can convert the coordinate system (x, y) of the analytical range vector C into the coordinate system (x', y') of the axial direction S. FIG. 13 shows an example of a conversion equation of the coordinate systems. As shown in FIG. 12, an angle formed by the axial direction S and the analytical range vector C is referred to as a degree θ.

Figure 14:
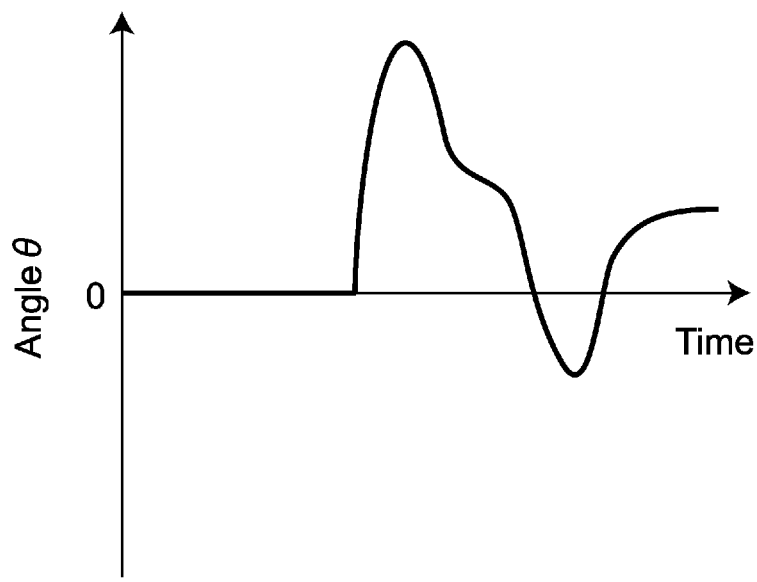
FIG. 14 is a graph showing a time change of an angle formed by the axial direction and the motion vector that are extracted by the information extracting unit of the image processing apparatus.

The information extracting unit 15 can extract an angle of the analytical range vector C with respect to the axial direction S, as motion information. FIG. 14 is a graph showing an example of a time change of the angle of the analytical range vector C with respect to the axial direction S. As shown in FIG. 14, the degree θ varies with an imaging time (frame) of the analysis-target moving image.

In the case where the value of the degree θ (absolute value) is large, this shows that the motion of the analysis target included in the analytical range R is not matched with the axial direction S. In the case where the value of the degree θ is small, this shows that the motion of the analysis target included in the analytical range R is matched with the axial direction S. In other words, whether a motion direction of the analysis target is matched with the axial direction S or not can be grasped from this motion information.

Figure 15:
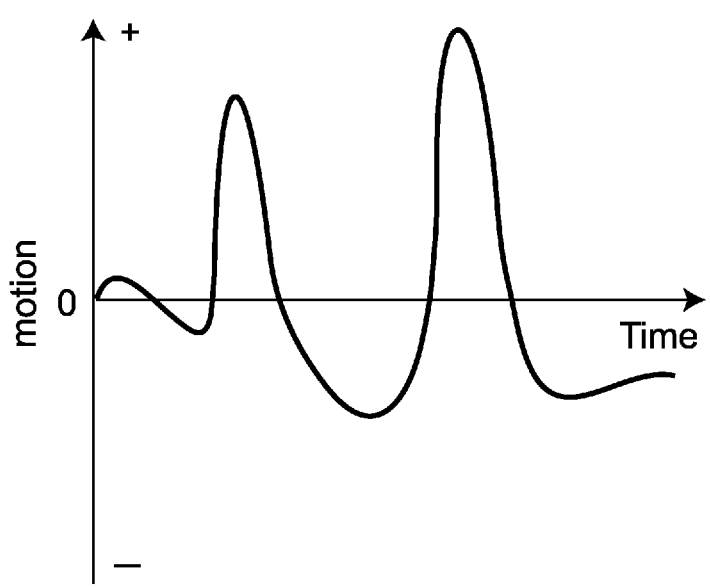
FIG. 15 is a graph showing a time change of a motion amount with respect to the axial direction that is extracted by the information extracting unit of the image processing apparatus.

Additionally, the information extracting unit 15 can extract the motion amount of the analytical range vector C with respect to the axial direction S, as motion information. The information extracting unit 15 can set the motion amount of the projected vector C' (i.e., the length of the projected vector C' represented by (x', y')) as the motion amount of the analytical range vector C with respect to the axial direction S. FIG. 15 is a graph showing an example of a time change of the motion amount (motion) of the analytical range vector C with respect to the axial direction S.

As shown in FIG. 15, the motion amount with respect to the axial direction S varies with an imaging time (frame) of the analysis-target moving image. As described above, the motion amount with respect to the axial direction S is the motion amount of the projected vector C', which is projected onto the axial direction S. Even when the motion amount of the analytical range vector C is large, if the motion direction thereof differs from the axial direction S, the motion amount with respect to the axial direction S is small. In other words, how large the motion of the analysis target with respect to the axial direction is can be grasped from this motion information.

Additionally, the information extracting unit 15 can extract the motion amount having a motion direction within a predetermined angle from the axial direction S, as motion information. The information extracting unit 15 can extract the motion amount of the analytical range vector C in which the degree θ formed together with the axial direction S is within the predetermined angle (i.e., the length of the analytical range vector C represented by (x, y)). The predetermined angle (for example, +/−30 degrees) is arbitrarily set, and may be preset or may be set by the user.

Figure 16:
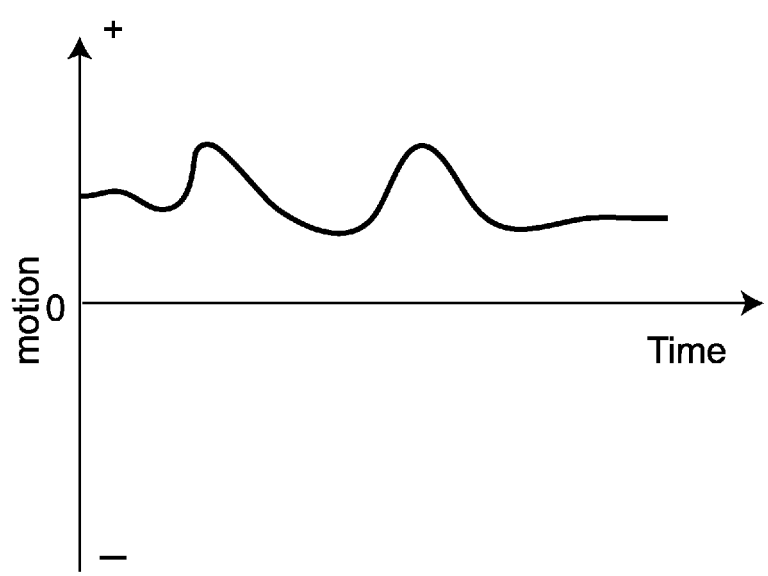
FIG. 16 is a graph showing a time change of the motion amount of the motion vector within a predetermined angle from the axial direction extracted by the information extracting unit of the image processing apparatus.

When the angle range of a motion direction to be extracted is small, the user can set the angle to be small. When the angle range of a motion direction to be extracted is large, the user can set the angle to be large. FIG. 16 is a graph showing an example of a time change of the motion amount (motion) of the analytical range vector C within a predetermined angle from the axial direction S. Since the motion amount of the analytical range vector C, which is out of the predetermined angle or has a direction different from the axial direction S, is not extracted, the user can grasp the motion amount of a desired motion direction.

It should be noted that in the above description, the information extracting unit 15 extracts the motion information of the analytical range vector C calculated for the analytical range R, but may similarly calculate motion information of the calculation section vector B calculated for each of the calculation sections D (see FIG. 7). In other words, the motion information as shown in FIGS. 14 to 16 may be extracted for each of the calculation sections D.

The result outputting unit 16 outputs the motion information supplied from the information extracting unit 15 and presents the motion information to the user. As shown in FIGS. 14 to 16, for example, the result outputting unit 16 can generate an image including a graph of the motion information and shows the image on a display.

Figure 17A:
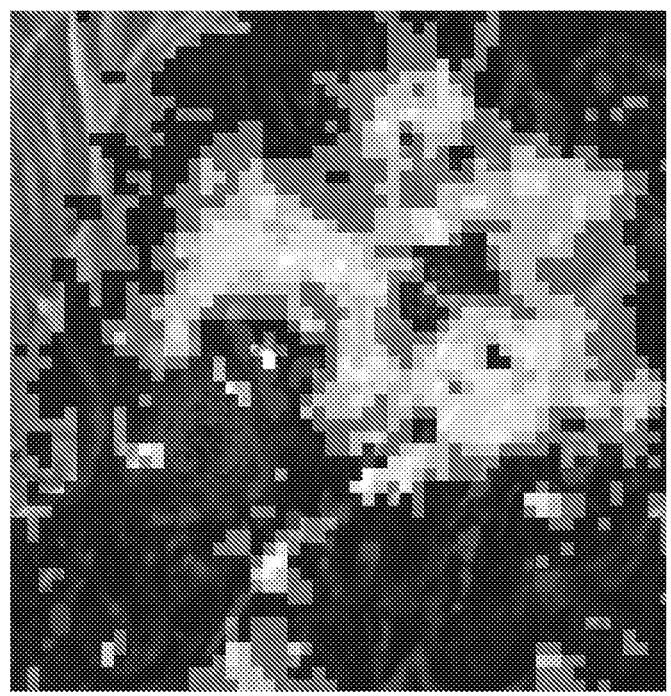
FIGS. 17A and 17B are images each showing a time change of the motion amount with respect to the axial direction that is generated by a result outputting unit of the image processing apparatus.
Figure 17B:
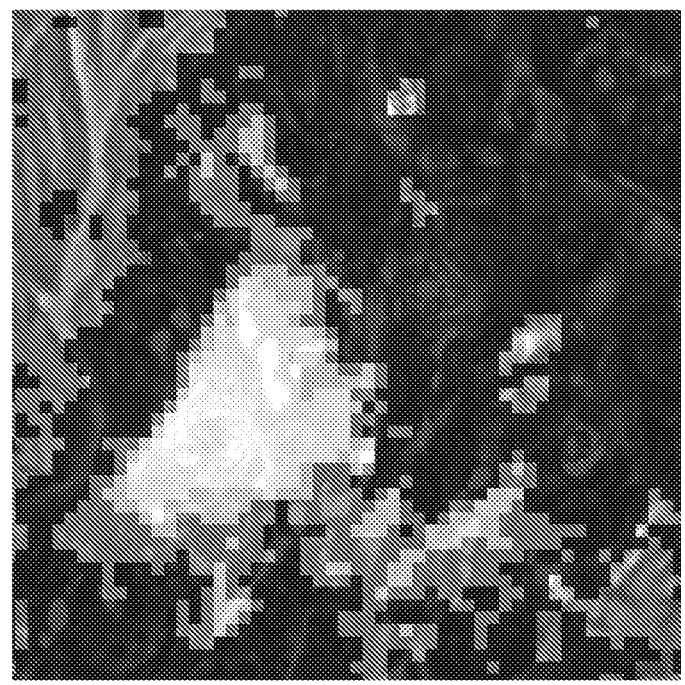

Additionally, the result outputting unit 16 may perform mapping on the motion information in the analysis-target moving image and generate a motion-information presenting image. FIGS. 17A and 17B are examples of the motion-information presenting image. FIG. 17A is a motion-information presenting image at time 1. FIG. 17B is a motion-information presenting image at time 2.

Figure 18:
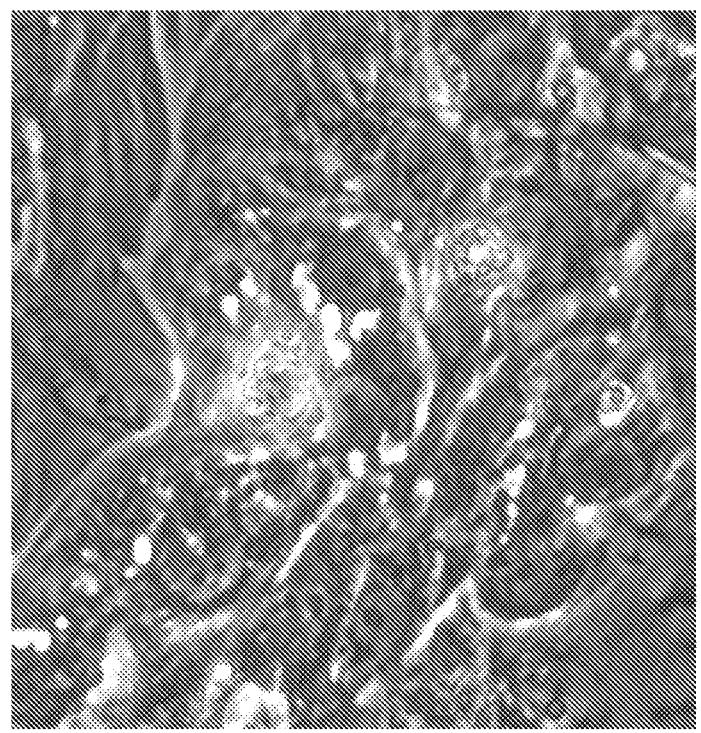
FIG. 18 is an analysis-target moving image as a source for generating the images shown in FIGS. 17A and 17B.

FIG. 18 is an analysis-target moving image that is a source of the motion-information presenting images shown in FIGS. 17A and 17B and is an image of cardiac myocytes. As described above, the axial-direction setting unit 14 sets the axial direction S in one direction of the analysis-target moving image.

As shown in FIGS. 17A and 17B, the result outputting unit 16 can express the motion amount of the calculation section vector B with respect to the axial direction S, in shades of gray, color coding, or the like, for each of the calculation sections D. In FIGS. 17A and 17B, white sections represent the calculation sections D that have large motion amounts with respect to the axial direction S, and black sections represent the calculation sections D that have small motion amounts with respect to the axial direction S.

The motion-information presenting image at time 1 of FIG. 17A shows cardiac myocytes in contraction. The motion-information presenting image at time 2 of FIG. 17B shows cardiac myocytes in relaxation. Comparing FIG. 17A with FIG. 17B, the distribution of the white sections and the black sections is different between those figures. This shows that sections having large motion amounts with respect to the axial direction differ with time. It is found that the motion direction of the cardiac myocytes can be grasped from those images.

Figure 19:
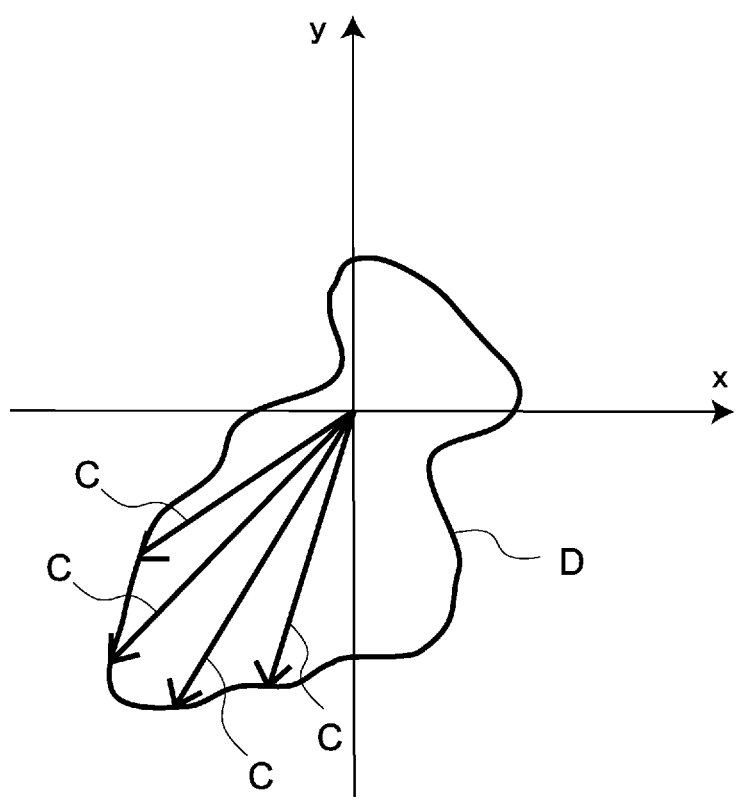
FIG. 19 is a graph showing a time change of the motion vector that is generated by the result outputting unit of the image processing apparatus.

Further, the result outputting unit 16 may present the analytical range vector C to the user. FIG. 19 is a schematic diagram showing an example in which the analytical range vectors C are presented. As shown in FIG. 19, the result outputting unit 16 may present the analytical range vectors C in one graph, the analytical range vectors C being calculated for the analytical range R at different times of the analysis-target moving image.

Additionally, the result outputting unit 16 may present a line D that connects the tip ends of the analytical range vectors C, which are calculated for the analytical range R at different times of the analysis-target moving image. The shape of the line D indicates a tendency of a time change of the analytical range vector C. For example, the line D of FIG. 19 is extended in the lower left direction, and this indicates that the motion in that direction is large in the analytical range R.

If the motion of the analysis-target moving image in the analytical range R is isotropic, the line D has a shape close to a circle. In other words, the user can intuitively grasp the motion direction in the analytical range R by referring to the shape of the line D. Further, the result outputting unit 16 may present the calculation section vectors B calculated for the respective calculation sections D, similarly to the analytical range vectors C.

Figure 20:
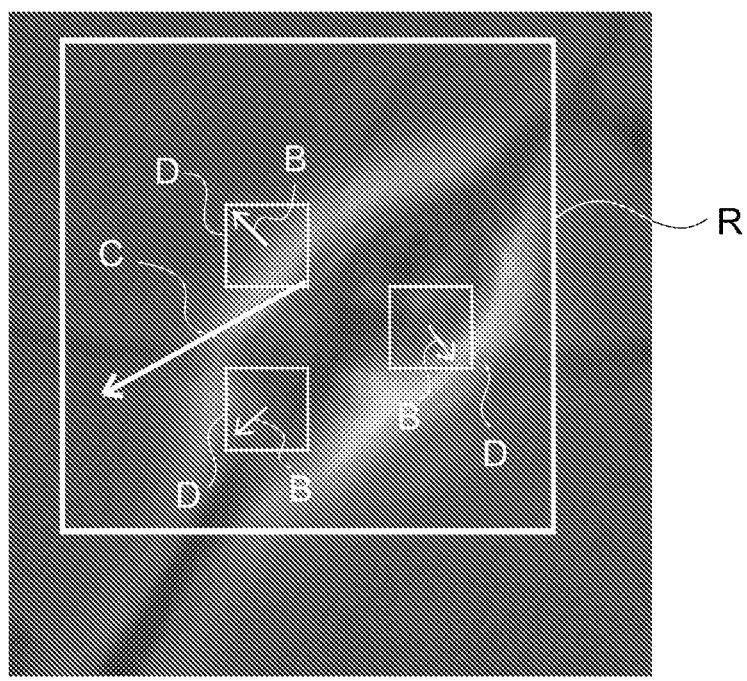
FIG. 20 is an example of an image in which the motion vectors are superimposed on the analysis-target moving image generated by the result outputting unit of the image processing apparatus.

Additionally, the result outputting unit 16 may generate an image in which the analytical range vector C is superimposed on the analysis-target moving image, to present the image to the user. FIG. 20 is an example of an image in which the analytical range vector C is superimposed on the analysis-target moving image.

As shown in FIG. 20, the result outputting unit 16 may present the calculation section vectors B together with the analytical range vector C and may present only calculation section vectors B having large motion amounts. Further, the result outputting unit 16 may present calculation section vectors B having a motion direction that is the same as the analytical range vector C or having an angle within a predetermined angle.

Figure 21:
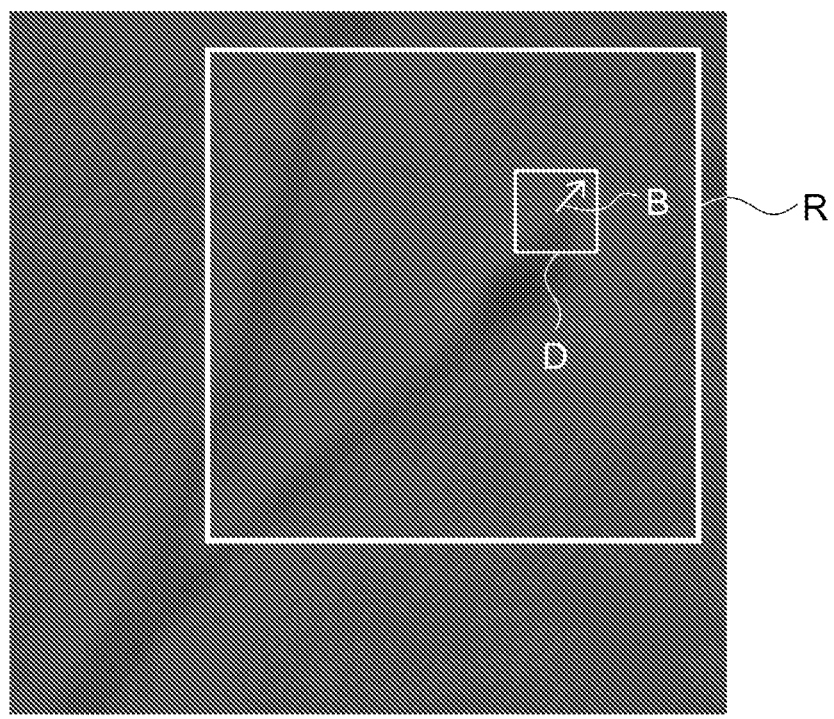
FIG. 21 is an example of an image in which the motion vector is superimposed on the analysis-target moving image generated by the result outputting unit of the image processing apparatus.

Additionally, the result outputting unit 16 may superimpose the calculation section vector B of a predetermined calculation section D on the analysis-target moving image and generate an image. FIG. 21 is an example of an image in which the calculation section vector B is superimposed on the analysis-target moving image. In the example shown in FIG. 21, the calculation section vector B of the calculation section D, which corresponds to the tip end of the axon of the neuron, is superimposed on the analysis-target moving image.

The calculation section D presenting the calculation section vector B may be specified by the user or may be determined by image processing performed on the analysis-target moving image. For example, when an object that is extended by image processing performed on the analysis-target moving image is detected, the result outputting unit 16 can present the calculation section vector B of the calculation section D, which is located at the tip end of the object.

Figure 22:
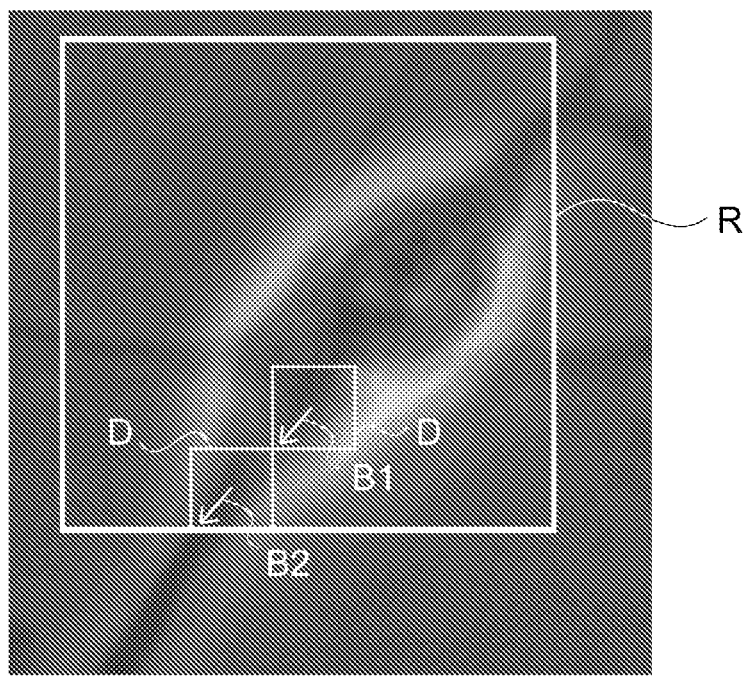
FIG. 22 is an example of an image in which the motion vectors are superimposed on the analysis-target moving image generated by the result outputting unit of the image processing apparatus.

Moreover, the result outputting unit 16 may superimpose the calculation section vectors B of different frames in the analysis-target moving image on the analysis-target moving image and generate an image. FIG. 22 is an example of an image in which the calculation section vectors B of different frames are superimposed on the analysis-target moving image.

The result outputting unit 16 can superimpose a calculation section vector B2 and a calculation section vector B1 on the analysis-target moving image. The calculation section vector B2 is the largest in a certain frame. The calculation section vector B1 is the largest in a frame that is one frame before the certain frame. The result outputting unit 16 may present the calculation section vectors B of a larger number of different frames. This allows the user to grasp a transition of the motion in the analysis-target moving image.

The result outputting unit 16 can also calculate a distance of the motion by integrating the calculation section vector B or the analytical range vector C, or calculate an acceleration rate of the motion by differentiating the calculation section vector B or the analytical range vector C, for presentation of the result.

The image processing apparatus 10 has the functional configuration as described above. In the image processing apparatus 10, as described above, the motion in the analysis-target moving image is presented in accordance with the motion direction. This allows an evaluation of the motion of the analysis target based on not only the motion amount but also the motion direction.

Figure 23:
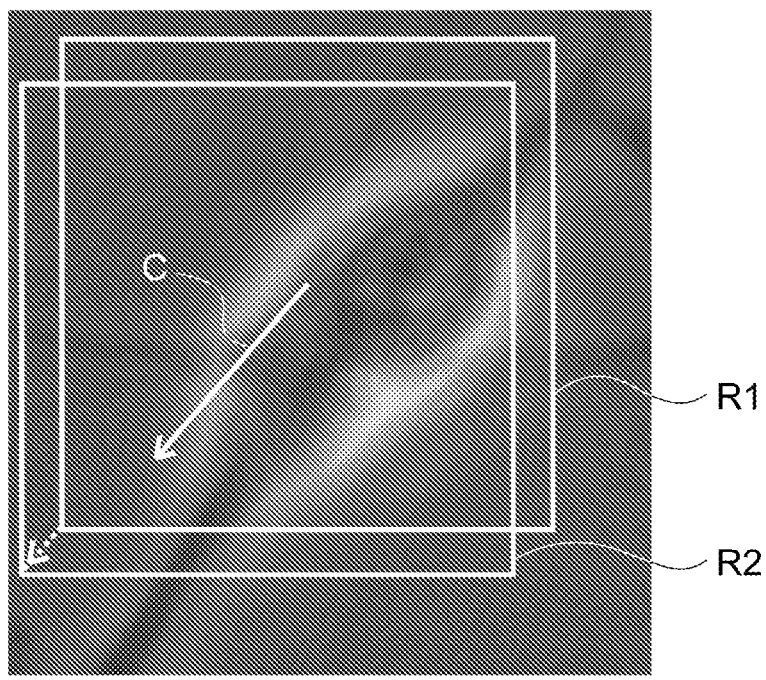
FIG. 23 is a schematic diagram showing a movement of the analytical range by the range specifying unit of the image processing apparatus.

It should be noted that the range specifying unit 12 specifies the analytical range R in the analysis-target moving image, but may move the analytical range R with the elapse of time of the analysis-target moving image. FIG. 23 is a schematic diagram showing a movement of the analytical range R. An analytical range R1 is an analytical range that is set at a predetermined time in the analysis-target moving image. An analytical range R2 is an analytical range that is set at a predetermined time after the analytical range R1 is set.

As shown in FIG. 23, the range specifying unit 12 can move the analytical range R1 in the direction of the analytical range vector C and set the analytical range R2 as a new analytical range. The amount of movement of the analytical range may be a predetermined amount or may be adjusted in accordance with the magnitude of the analytical range vector C.

The motion analyzing unit 13 can analyze the motion of the newly-set analytical range R2 as described above, to calculate a calculation section vector. The information extracting unit 15 can extract motion information based on the calculation section vector or an analytical range vector and an axial direction.

By such processing, since the analytical range R moves in a direction of the analytical range vector at predetermined time intervals, the motion can be evaluated by following the motion of the analysis target. For example, in the axonal transport of a neuron (see FIG. 3), the analytical range R is moved together with the transport object, and the transport can be evaluated.

(Operation of Image Processing Apparatus)

Figure 24:
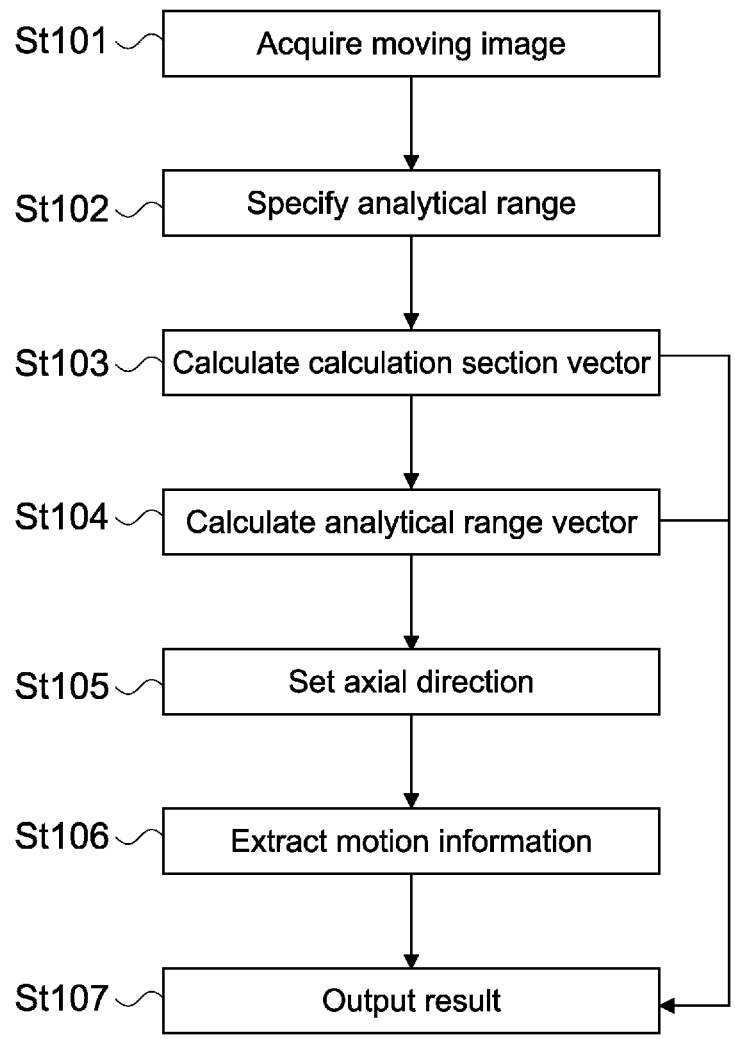
FIG. 24 is a flowchart showing an operation of the image processing apparatus.

The operation of the image processing apparatus 10 will be described. FIG. 24 is a flowchart showing the operation of the image processing apparatus 10.

As shown in FIG. 24, the moving image acquiring unit 11 acquires an analysis-target moving image (St101), and the range specifying unit 12 specifies an analytical range (St102). Subsequently, the motion analyzing unit 13 calculates a calculation section vector in the analytical range (St103), and the information extracting unit 15 calculates an analytical range vector (St104).

The axial-direction setting unit 14 then sets an axial direction in the analytical range (St105). At that time, the axial-direction setting unit 14 may set the axial direction based on the analytical range vector. Subsequently, the information extracting unit 15 extracts motion information based on the calculation section vector or the analytical range vector and the axial direction (St106), and the result outputting unit 16 presents the motion information (St107).

It should be noted that the result outputting unit 16 may generate an image in which the calculation section vector or the analytical range vector is superimposed on the analysis-target moving image. Further, the range specifying unit 12 may move the analytical range in accordance with the analytical range vector along with the elapse of time of the analysis-target moving image.

Figure 25:
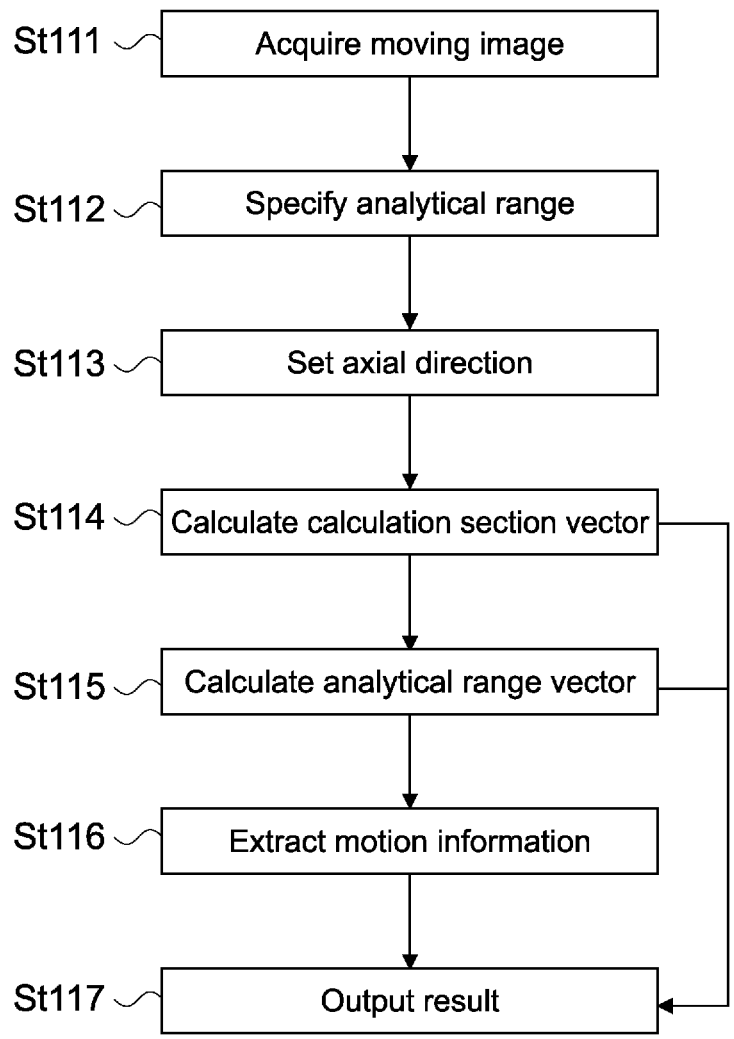
FIG. 25 is a flowchart showing another operation of the image processing apparatus.

Additionally, the image processing apparatus 10 may operate as follows. FIG. 25 is a flowchart showing another operation of the image processing apparatus 10.

As shown in FIG. 25, the moving image acquiring unit 11 acquires an analysis-target moving image (St111), and the range specifying unit 12 specifies an analytical range (St112). Subsequently, the axial-direction setting unit 14 sets an axial direction in the analytical range (St113). The axial-direction setting unit 14 can set the axial direction by the user's specification or by image processing performed on the analysis-target moving image.

Subsequently, the motion analyzing unit 13 calculates a calculation section vector in the analytical range (St114), and the information extracting unit 15 calculates an analytical range vector (St115). Subsequently, the information extracting unit 15 extracts motion information based on the calculation section vector or analytical range vector and the axial direction (St116), and the result outputting unit 16 presents the motion information (St117).

It should be noted that the result outputting unit 16 may generate an image in which the calculation section vector or the analytical range vector is superimposed on the analysis-target moving image. Further, the range specifying unit 12 may move the analytical range in accordance with the analytical range vector along with the elapse of time of the analysis-target moving image.

(Hardware Configuration of Image Processing Apparatus)

The functional configuration of the image processing apparatus 10 as described above can be achieved by a hardware configuration described below.

Figure 26:
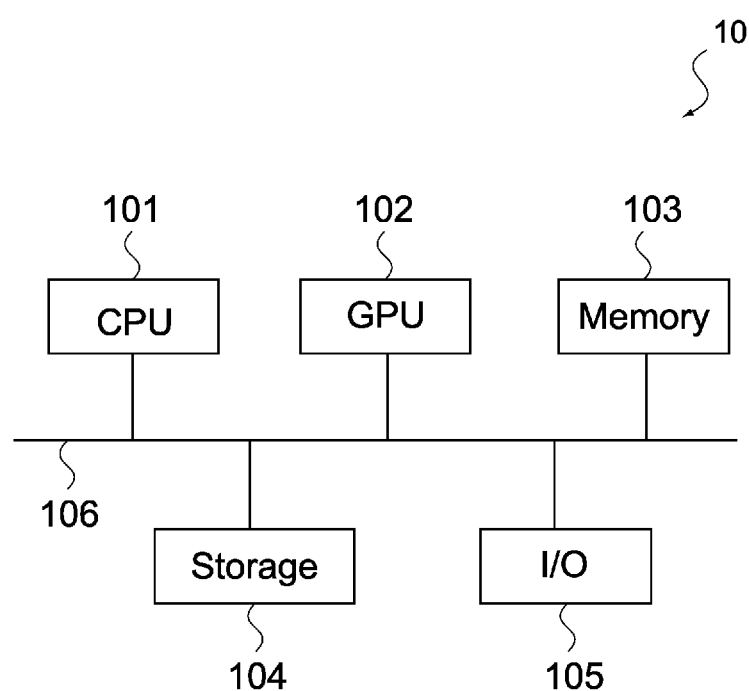
FIG. 26 is a schematic diagram showing a hardware configuration for achieving the functional configuration of the image processing apparatus.

FIG. 26 is a schematic diagram showing a hardware configuration of the image processing apparatus 10. As shown in FIG. 26, the image processing apparatus 10 includes, as a hardware configuration, a CPU (Central Processing Unit) 101, a GPU (Graphic Processing Unit) 102, a memory 103, storage 104, and an I/O (Input/Output unit) 105. Those components are connected to one another via a bus 106.

The CPU 101 controls other configurations according to a program stored in the memory 103, and also performs data processing according to the program, to store a processing result in the memory 103. The CPU 101 may be a microprocessor.

The GPU 102 is controlled by the CPU 101 and executes image processing. The CPU 101 can cause the GPU 102 to execute parallel computing, to calculate a motion vector and extract motion information at high speed. The GPU 102 may be a microprocessor.

The memory 103 stores programs and data executed by the CPU 101. The memory 103 may be a RAM (Random Access Memory).

The storage 104 stores programs and data. The storage 104 may be an HDD (Hard disk drive) or an SSD (solid state drive).

The I/O 105 receives an input to the image processing apparatus 10 or supplies an output of the image processing apparatus 10 to the outside. The I/O 105 includes input devices such as a keyboard and a mouse, output devices such as a display, and connection interfaces such as a network.

The hardware configuration of the image processing apparatus 10 is not limited to those described herein, and may be any configuration as long as the functional configuration of the image processing apparatus 10 can be achieved. Additionally, a part or whole of the hardware configuration described above may be present over the network.

It should be noted that the present disclosure can adopt the following configurations.

(1) An information processing apparatus including:

at least one processor configured to receive an image of a plurality of images; and at least one storage medium configured to store processor-executable instructions that, when executed by the at least one processor, perform a method including:

setting at least one axial direction in the image, wherein the image includes an analysis target; and determining motion information for the analysis target by analyzing motion of the analysis target to identify, with respect to the at least one axial direction, at least one of a motion amount of the analysis target and a motion direction of the analysis target.

(2) The information processing apparatus according to (1), wherein setting the at least one axial direction in the image includes setting a plurality of axial directions corresponding to a plurality of sections in the image.

(3) The information processing apparatus according to (1)-(2), wherein the at least one processor is further configured to receive a user input indicating selection of the at least one axial direction, and setting the at least one axial direction includes determining the at least one axial direction based on the user input.

(4) The information processing apparatus according to (1)-(3), wherein the method further includes determining a shape of the cell by analyzing the image, and setting the at least one axial direction includes determining a direction based on the shape of the cell.

(5) The information processing apparatus according to (4), wherein setting the at least one axial direction in the image includes setting a plurality of axial directions corresponding to a plurality of sections in the image, wherein the plurality of axial directions are determined based, at least in part, on the shape of the cell and a position of each section of the plurality of sections.

(6) The information processing apparatus according to (1)-(5), wherein the method further includes calculating a motion vector for the analysis target by comparing a first pixel group in the image to a plurality of second pixel groups in a second image acquired prior to the image, and determining a second pixel group among the plurality of second pixel groups having a largest degree of matching with the first pixel group.

(7) The information processing apparatus according to (1)-(6), wherein the apparatus further includes a display configured to display the motion information, and the method further includes displaying the motion information on the display.

(8) The information processing apparatus according to (1)-(7), wherein the method further includes calculating a motion vector for the analysis target and projecting the motion vector onto the at least one axial direction.

(9) The information processing apparatus according to (8), wherein calculating the motion vector includes determining a plurality of motion vectors for a plurality of sections of the image and calculating an analytical range vector by analyzing at least a portion of the plurality of motion vectors, and projecting the motion vector onto the at least one axial direction includes projecting the analytical range vector onto the at least one axial direction.

(10) The information processing apparatus according to (8)-(9), wherein the information processing apparatus further includes a display, and the method further includes displaying the analytical range vector on the display.

(11) The information processing apparatus according to (8)-(9), wherein calculating the analytical range vector includes summing or averaging the portion of the motion vectors.

(12) The information processing apparatus according to (9)-(11), wherein calculating the analytical range vector includes identifying a motion vector from among the portion of the motion vectors as having a certain motion amount and setting the motion vector as the analytical range vector.

(13) The information processing apparatus according to (9)-(12), wherein setting the at least one axial direction includes setting the at least one axial direction to a direction of a motion vector of the plurality of motion vectors.

(14) The information processing apparatus according to (9)-(13), wherein the method further includes displaying motion information corresponding to the analytical range vector.

(15) The information processing apparatus according to (1)-(14), wherein the at least one axial direction is relative to a feature of the analysis target.

(16) The information processing apparatus according to (1)-(15), wherein the analysis target in the image is a neuron.

(17) The information processing apparatus according to (1)-(16), wherein determining motion information includes determining a component of the motion vector parallel to the at least one axial direction.

(18) The information processing apparatus according to (1)-(17), wherein determining motion information includes determining an angle between the motion vector and the at least one axial direction.

(19) The information processing apparatus according to (1)-(18), wherein the method further includes calculating a value by summing or averaging a component of the motion information and displaying the value, wherein the component of the motion information is selected from the group consisting of a component of the motion vector parallel to the at least one axial direction and an angle between the motion vector and the at least one axial direction.

(20) The information processing apparatus according to (1)-(19), wherein the at least one storage medium is further configured to store the motion information.

(21) At least one non-transitory computer-readable storage medium storing computer-executable instructions that, when executed, perform a method for processing an image, the method including:
setting at least one axial direction in the image, wherein the image includes an analysis target; and
determining motion information for the analysis target by analyzing motion of the analysis target to identify, with respect to the at least one axial direction, at least one of a motion amount of the analysis target and a motion direction of the analysis target.

(22) An information processing system including:
an imaging apparatus configured to acquire a plurality of images;
at least one processor configured to receive an image of the plurality of images; and
at least one storage medium configured to store processor-executable instructions that, when executed by the at least one processor, perform a method including:
setting at least one axial direction in the image, wherein the image includes an analysis target; and
determining motion information for the analysis target by analyzing motion of the analysis target to identify, with respect to the at least one axial direction, at least one of a motion amount of the analysis target and a motion direction of the analysis target.

(23) The information processing system according to (22), the system further includes a display configured to display the motion information.

(24) A method for processing an image, the method including:
setting at least one axial direction in the image, wherein the image includes an analysis target; and
determining motion information for the analysis target by analyzing motion of the analysis target to identify, with respect to the at least one axial direction, at least one of a motion amount of the analysis target and a motion direction of the analysis target.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST 10 image processing apparatus
11 moving image acquiring unit
12 range specifying unit
13 motion analyzing unit
14 axial-direction setting unit
15 information extracting unit
16 result outputting unit

The invention claimed is:

1. An information processing apparatus comprising:
at least one processor configured to receive an image of an analysis target in a plurality of images of the analysis target; and
at least one storage medium configured to store processor-executable instructions that, when executed by the at least one processor, perform a method comprising:
setting at least one axial direction in the image of the analysis target;
calculating an analytical range vector in an analytical range set in the image of the analysis target, wherein calculating the analytical range vector comprises selecting a motion vector from among a plurality of motion vectors and setting the motion vector as the analytical range vector; and
determining motion information for the analysis target by projecting the analytical range vector onto the at least one axial direction to identify, at least one of a motion amount of the analysis target and a motion direction of the analysis target,
wherein the analysis target includes at least one cell body of a neuron.

2. The information processing apparatus of claim 1, wherein setting the at least one axial direction in the image of the analysis target comprises setting a plurality of axial directions corresponding to a plurality of sections in the image of the analysis target.

3. The information processing apparatus of claim 2, wherein the plurality of axial directions are radially set from a center of the at least one cell body of the neuron.

4. The information processing apparatus of claim 3, wherein the analysis target further includes at least one axon of the neuron, the at least one axial direction is set as along the axon of the neuron.

5. The information processing apparatus of claim 4, wherein the motion information includes motion information determined for the at least one cell body of the neuron and motion information determined for the axon of the neuron.

6. The information processing apparatus of claim 1, wherein the at least one processor is further configured to receive a user input indicating selection of the at least one axial direction, and setting the at least one axial direction comprises determining the at least one axial direction based on the user input.

7. The information processing apparatus of claim 1, wherein selecting the motion vector from among the plurality of motion vectors comprises identifying the motion vector from among the plurality of motion vectors as having a certain motion amount and setting the motion vector as the analytical range vector.

8. The information processing apparatus of claim 1, wherein the method further comprises determining a shape of the analysis target by analyzing the image of the analysis target, and setting the at least one axial direction comprises determining a direction based on the shape of the analysis target.

9. The information processing apparatus of claim 8, wherein setting the at least one axial direction in the image of the analysis target comprises setting a plurality of axial directions corresponding to a plurality of sections in the image of the analysis target, wherein the plurality of axial directions are determined based, at least in part, on the shape of the analysis target and a position of each section of the plurality of sections.

10. The information processing apparatus of claim 1, wherein the method further comprises calculating at least one of the plurality of motion vectors for the analysis target by comparing a first pixel group in the image of the analysis target to a plurality of second pixel groups in a second image of the analysis target acquired prior to the image, and determining a second pixel group among the plurality of second pixel groups having a largest degree of matching with the first pixel group.

11. The information processing apparatus of claim 1, wherein the apparatus further comprises a display configured to display the motion information, and the method further comprises displaying the motion information on the display.

12. The information processing apparatus of claim 1, wherein the information processing apparatus further comprises a display, and the method further comprises displaying the analytical range vector on the display.

13. The information processing apparatus of claim 1, wherein calculating the analytical range vector comprises summing or averaging at least some of the plurality of motion vectors.

14. The information processing apparatus of claim 1, wherein setting the at least one axial direction comprises setting the at least one axial direction to a direction of a second motion vector of the plurality of motion vectors.

15. The information processing apparatus of claim 1, wherein the method further comprises displaying motion information corresponding to the analytical range vector.

16. The information processing apparatus of claim 1, wherein the at least one axial direction is relative to a feature of the analysis target.

17. The information processing apparatus of claim 1, wherein determining motion information comprises determining a component of the motion vector parallel to the at least one axial direction.

18. The information processing apparatus of claim 1, wherein determining motion information comprises determining an angle between the motion vector and the at least one axial direction.

19. The information processing apparatus of claim 1, wherein the method further comprises calculating a value by summing or averaging a component of the motion information and displaying the value, wherein the component of the motion information is selected from the group consisting of a component of the motion vector parallel to the at least one axial direction and an angle between the motion vector and the at least one axial direction.

20. The information processing apparatus of claim 1, wherein the at least one storage medium is further configured to store the motion information.

21. An information processing system comprising:
at least one processor configured to receive an image of an analysis target in a plurality of images of the analysis target; and
at least one storage medium configured to store processor-executable instructions that, when executed by the at least one processor, perform a method comprising:
setting at least one axial direction in the image of the analysis target;
calculating an analytical range vector in an analytical range set in the image of the analysis target, wherein calculating the analytical range vector comprises selecting a motion vector from among a plurality of motion vectors and setting the motion vector as the analytical range vector; and
determining motion information for the analysis target by projecting the analytical range vector onto the at least one axial direction to identify, at least one of a motion amount of the analysis target and a motion direction of the analysis target,
wherein the analysis target includes at least one cell body of a neuron.

22. A non-transitory computer readable storage medium having executable instructions stored thereon that, when executed by a processor, cause the processor to perform a method comprising:
receiving an image of an analysis target in a plurality of images of the analysis target;
setting at least one axial direction in the image of the analysis target;
calculating an analytical range vector in an analytical range set in the image of the analysis target, wherein calculating the analytical range vector comprises selecting a motion vector from among a plurality of motion vectors and setting the motion vector as the analytical range vector; and
determining motion information for the analysis target by projecting the analytical range vector onto the at least one axial direction to identify, at least one of a motion amount of the analysis target and a motion direction of the analysis target,
wherein the analysis target includes at least one cell body of a neuron.

* * * * *